(12) United States Patent
Vieweger et al.

(10) Patent No.: US 12,099,464 B2
(45) Date of Patent: Sep. 24, 2024

(54) PROCESSING SYSTEM FOR A VEHICLE

(71) Applicant: ZF Friedrichshafen AG, Friedrichshafen (DE)

(72) Inventors: Wolfgang Vieweger, Langenargen (DE); Marc Schreiner, Tettnang (DE); Jonas Gomes Filho, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/922,253

(22) PCT Filed: Mar. 31, 2021

(86) PCT No.: PCT/EP2021/058470
§ 371 (c)(1),
(2) Date: Oct. 28, 2022

(87) PCT Pub. No.: WO2021/219321
PCT Pub. Date: Nov. 4, 2021

(65) Prior Publication Data
US 2023/0177001 A1    Jun. 8, 2023

(30) Foreign Application Priority Data
Apr. 30, 2020    (DE) .................. 10 2020 205 525.4

(51) Int. Cl.
*G06F 11/00*    (2006.01)
*G06F 11/20*    (2006.01)
*G06F 11/30*    (2006.01)
*G06F 13/36*    (2006.01)
*G06F 15/80*    (2006.01)

(52) U.S. Cl.
CPC ...... *G06F 15/8038* (2013.01); *G06F 11/2028* (2013.01); *G06F 11/3024* (2013.01); *G06F 13/36* (2013.01)

(58) Field of Classification Search
CPC .................... G06F 11/2028; G06F 11/3024
See application file for complete search history.

(56) References Cited

U.S. PATENT DOCUMENTS

| | | | | |
|---|---|---|---|---|
| 10,521,321 | B2 * | 12/2019 | Jong | G06F 11/277 |
| 11,390,290 | B2 * | 7/2022 | Kurimoto | B60W 50/045 |
| 2018/0245561 | A1 * | 8/2018 | Perez | B60R 16/023 |
| 2018/0370540 | A1 | 12/2018 | Yousuf et al. | |
| 2019/0258251 | A1 | 8/2019 | Ditty et al. | |
| 2022/0080992 | A1 * | 3/2022 | Yousuf | B60W 50/023 |
| 2022/0402121 | A1 * | 12/2022 | Kogan | G06F 11/3024 |

OTHER PUBLICATIONS

International Search Report (with English translation) and Written Opinion from corresponding PCT Application PCT/EP2021/058470 prepared on Jun. 16, 2021 and mailed on Jun. 25, 2021 (11 pages).

\* cited by examiner

*Primary Examiner* — Amine Riad
(74) *Attorney, Agent, or Firm* — Crowell & Moring LLP

(57) ABSTRACT

A processing system for use in a vehicle comprises numerous simple processors, numerous parallel processors, an interface for connecting to a communication bus in the vehicle, and a monitoring device that is connected to the interface and each of the processors. The monitoring device is designed for redundant configuration of the simple processors and/or the parallel processors in relation to one another.

18 Claims, 1 Drawing Sheet

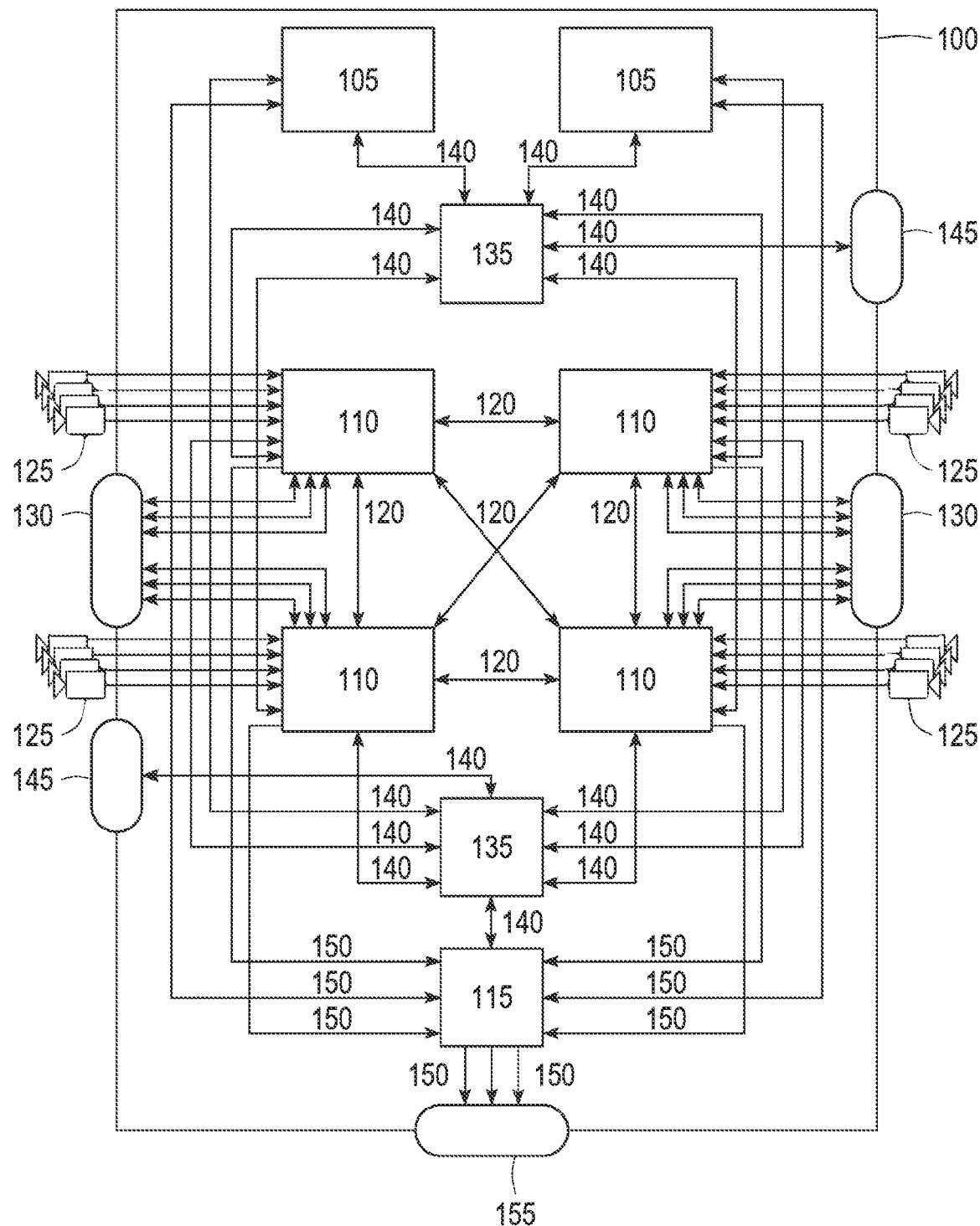

PROCESSING SYSTEM FOR A VEHICLE

CROSS-REFERENCE TO RELATED APPLICATIONS

This application is a U.S. national stage application under 35 U.S.C. § 371 of PCT Application No. PCT/EP2021/058470, filed on Mar. 31, 2021, and published as WO 2021/219321 A1 on Nov. 4, 2021, which claims priority from German Application No. DE 10 2020 205 525.4, filed on Apr. 30, 2020, the entirety of which are each hereby fully incorporated by reference herein.

The present invention relates to a processing system for a vehicle. The invention relates in particular to a processing system for controlling a driving function in the vehicle.

A processing system that is powerful enough to execute current concepts regarding data processing, such as automatically recognizing objects in a vehicle's environment and reaction appropriately, is necessary for the automation of a driving function in a vehicle. In addition, the processing system must satisfy the highest requirements for functional safety and exhibit at least some tolerance with regard to certain error statuses.

The processing system should preferably satisfy the requirements defined in ISO 26262 and particularly for the various ASILs (Automotive Safety Integrity Levels). It should also be possible to upgrade the processing system such that it can be improved for future, as yet unknown requirements.

The fundamental object of the present invention is to create an improved processing system for use in a vehicle. This problem is solved by the invention with the subject matter of the independent claims. Dependent claims describe preferred embodiments.

A processing system for use in a vehicle comprises numerous simple processors, numerous parallel processors, an interface for connecting to a communication bus in the vehicle, and a monitoring system that is connected to the interface and each of the processors. The monitoring system is designed for redundant configuration of the simple processors and/or the parallel processor among themselves.

The processing system can provide a scalable and redundant hardware platform for a fail-operational system. Such a system is resilient and designed to continue to function when its control systems malfunction to a certain extent. Fail-safe systems, in contrast, become safe in the event of an error. Such a state does not exist in general in the controlling of a vehicle because even when stationary, the vehicle is a hazard to other vehicles or may be endangered by other vehicles.

The proposed assembly can allow a "native decomposition" at various levels, e.g. ASIL-B and ASIL-D. If sensor values are to be processed, the proposed processing system can allow the execution of different processes or algorithms on the basis of different sensors or sensor groups for the same purpose. This enables both a decomposition as well as an arbitration. The processing system can still be able to function when one or more simple and/or parallel processors malfunction. On the whole, the processing system can satisfy current ASIL requirements up to level D.

The simple processors are preferably of the same design, and the parallel processors are also preferably of the same design. The processing system can comprise other components of a computer, e.g. an internal clock, volatile and/or non-volatile memories, or an I/O system. The processors can be placed on a printed circuit board and connected to a power source. One embodiment contains a heat sink for discharging heat from one or more processors, in particular the parallel processors. The bearing surfaces of the processors can lie in the same plane for this, and the heat sink can have a flat bearing surface for the processors that need to be cooled. The heat sink can be part of an active cooling system that can comprise a closed liquid cooling circuit. The liquid cooling circuit can take the form of a liquid cooling system in particular.

The processing system can be designed to process a safety-relevant function. An error or malfunction could therefore have a direct or indirect impact on the safety of a human being or an object in the vehicle or in its environment.

It has been shown to be the case that a combination of a classic simple processor and a parallel processor is the best solution for control functions in vehicles, in particular motor vehicles. The simple processor can assume functions in particular that are difficult or even impossible to execute in parallel, such as an iterative or recursive calculation of a value. The parallel processor is more suited for functions that can be executed in parallel, in particular those that relate to detection in the environment of the vehicle. A parallel processor can also be configured to detect patterns in data, in particular for recognizing objects in images, merging data, solving linear algebra functions, implementing an artificial neural network, or functioning as artificial intelligence.

It is advantageous in particular for safety-relevant applications to operate processors in a redundant configuration instead of individually. The processing system can comprise numerous redundantly configured individual processors and redundantly configured parallel processors for this. It generally preferable to have backups for all of the components in the processing system, just in case their failure could impair the entire processing system. The simple processors can be doubled. The parallel processors can be quadrupled.

Redundancy does not necessarily have to be implemented at the processor level. Instead, numerous parallel processors can be operated such that they appear to function as a single processing environment for a problem that is to be processed. Redundancy or resiliency with regard to an error or malfunction can be obtained inherently through neighborly relationships between distributed data. If a processing component malfunctions, its results may be erroneous, but they will only affect a portion of the problem that is being processed. The overall problem, such as identifying an object in an image, may still be solved correctly.

Alternatively, the processing components in all of the parallel processors can be operated collectively in redundant configurations. The proposed configuration of simple and parallel processors may make it possible to control the movement of the vehicle such that an autonomy level according to SAE J3016 of four (high automation) or five (full automation) can be obtained.

The monitoring device can be configured to determine whether one of the simple processors or one of the parallel processors is malfunctioning. The monitoring device can have a processing component for this that is configured to monitor one or more of the other processors. Results or statuses of connected processors can be compared with one another or with predetermined threshold values or interval limits in order to determine errors. The monitoring device can execute a safety function with which a predetermined ASIL safety classification is satisfied, preferably up to the level ASIL-D.

The monitoring device is normally connected to the processors by a monitor bus, with which only a moderate bandwidth of ca. 100 Mbits/s is normally made available, but is still preferably designed as a safety-relevant interface according to ISO 26262.

It if has been determined that one of the processors is malfunctioning, a signal can be sent to the interface to the vehicle in order to notify another component in the vehicle of the defect. A processor that has been identified as malfunctioning can be shut off or reconfigured such that the defective component therein no longer participates in the processing results. In one embodiment, a processor or its individual components can also be shut off. This substantially or entirely prevents incorrect information from being provided to the communication bus.

A simple processor normally has a classic architecture and can come from the x86, x65 or ARM family, for example. The simple processor can comprise numerous cores, with the number of cores normally being limited to eight or less, even though there are simple processors with up to 64 cores. A clock cycle for a simple processor is normally higher than that of a parallel processor.

A parallel processor normally comprises substantially more processing components than a simple processor. By way of example, the parallel processor can be a dedicated graphics processor and comprise many thousand processing components (e.g. "shaders"). Alternatively, the parallel processor can also form an FPGA that comprises numerous elements that form numerous processing components, for example. The parallel processor can also be configured as a neural network comprising numerous artificial neurons, which form the basis of the network configuration.

Each processor is preferably placed in a dedicated semiconductor housing. The semiconductor housing is preferably designed to be placed on a printed circuit board and can comprise a BGA (Ball Grid Array) housing in particular, which contains electrical connections in a ball grid array. The printed circuit board, along with the processors and any other components can take the form of an individual unit. It is also possible to place numerous processors in the same semiconductor housing.

The parallel processors can be fully interconnected by communication busses. If there are n parallel processors, each parallel processor can be connected to every other parallel processor by a dedicated line. In this case, there can be ½*n*(n−1) communication busses. A communication bus between processors is also referred to as an inter-process communication (IPC) bus, and with which a very high bandwidth of ca. 100 Gbits/s or more is preferably made available.

The parallel processors can have sensor interfaces for connecting to numerous imaging sensors, wherein the parallel processors are preferably configured to process image data they have obtained from the sensors they are connected to. A sensor can comprise a camera, depth-of-field camera, stereo camera, radar sensor, lidar sensor, ultrasonic sensor, or some other type of sensor. In a particularly preferred embodiment, there are four parallel processors. It is also possible to connect one parallel processor to four imaging sensors. An FCI interface can be used for the connections to the sensors.

The processing system is preferably configured to control a driving function of the vehicle using signals on the communication bus. The control can take place directly through the provision of target values or control signals for longitudinal and/or lateral control. Alternatively, the control can also take place indirectly in that the processing system provides data to the communication bus that represent objects in the current environment of the vehicle, and the vehicle is controlled on the basis of these objects.

The processing system can also comprise at least two redundant communication modules. Each communication module can then be connected to each simple processor and each parallel processor. A high bandwidth of ca. 1 Gbits/s or more is preferably made available to a processor by each communication module; such a connection is also referred to as a fast communication interface (FCI).

The communication modules can each contain a communication interface for connecting to another processing system. This processing system can correspond in particular to the processing system described herein. This processing system can also have the same topology as the present processing system, or it can have another topology.

According to another aspect of the present invention, a system comprises numerous interconnected processing systems, at least one of which is of the same type as that described herein.

According to another aspect of the present invention, a vehicle comprises at least one of the processing systems described herein. The vehicle can be configured in particular to be controlled by the processing system with regard to its movement.

The invention shall now be described in greater detail in reference to the drawing, in which a processing system is illustrated.

FIG. 1 shows an exemplary processing system 100, designed in particular for operation in a vehicle. The processing system 100 comprises two simple processors 105 and four parallel processors 110, as well as a monitoring device 115. The number of simple processors 105 can be independent of the number of parallel processors 110. In one embodiment, there are connections for one or more further simple processors 105 and/or parallel processors 110, e.g. in the form of sockets, such that additional processors 105, 110 can be used to increase the computing capacity. An existing processor 105, 110 can be replaced at a socket. The processing system 100 can be designed to be populated with different processors 105, 110 in order to be able to form a cost-effective, energy-efficient, or powerful processing system 100, depending on the requirements.

The simple processors 105 can be redundant, such that they substantially execute the same assignments and any differences between the values that are obtained or the statuses of the simple processors 105 are detected by the monitoring device 115. The monitoring device 115 can simply be placed in the processing system 100. The monitoring device is preferably designed such that it satisfies predefined safety requirements, e.g. according to ASIL-D.

The parallel processors 110 can also be redundant. Two or more parallel processors 110 can also be configured to cooperate with an enlarged parallel processor 110. The parallel processors 110 are preferably connected to one another with IPC busses 120. More preferably, each parallel processor 110 is connected by a dedicated IPC bus 120 to each of the other parallel processors 110. There can be more IPC busses 120 for connecting sensors 125 to parallel processors 110. There can be a sensor interface 130 on the processing system 100 for this, in particular containing a plug-in connector.

A sensor 125 is preferably designed to scan an environment or an interior, or to detect a driving state of another vehicle. A sensor 125 can be an imaging sensor in particular, which provides data in at least two dimensions, which correlate to geometric dimensions in relation to the vehicle. By way of example, imaging sensors 125 comprise cameras, radar sensors, and lidar sensors. A non-imaging sensor 125 can also be connected, e.g. an acoustic sensor 125. In one embodiment, one or more sensors 125 for scanning physical parameters are connected to a drive motor in the vehicle. Another sensor 125 can be configured to determine a driving state of the vehicle, and detect a position, speed, rotational rate, or acceleration thereof.

There is preferably at least one communication module 135, which is also preferably configured to bundle numerous communication busses 140 and enable an orderly communication from elements connected to the communication busses 140. The bundling can take place on layer 2 or 3 in an ISO-OSI model. A communication bus 140 can also be referred to as an FCI. There is preferably one communication bus 140 for every connection between each communication module 135 and each of the processors 105, 110.

There is preferably also another communication module 135, which is connected to the processors 105, 110 by separate communication busses 140, such that there are redundant communication paths between the processors 105, 110.

A redundancy on up to three levels can be obtained by the proposed connection of the parallel processors 110 using IPC busses 150 and communication busses 140—once using an IPC bus 150, and twice using communication busses 140.

The processing system 100 can comprise a communication interface 145 that is connected to a communication module 135 by another communication bus 140. If there are numerous communication modules 135, each one can have a dedicated communication interface 145.

The monitoring device 115 is preferably connected to each processor 105, 110 by a monitoring bus 150. Point-to-point connections are preferably used for this, in order to prevent them from interacting in a detrimental manner, in particular in the event of a malfunction. There are one or more monitoring busses 150 for connecting the monitoring device 115 to an interface 155 in the processing system 100. The interface 155 is designed to be connected to a communication bus in the vehicle, which can comprise a CAN, FlexRay, or LIN bus.

The monitoring device 115 can have numerous functions. A first function can be the monitoring of the processors 105, 110. A second function can be the determination of control values for controlling a function in the vehicle, in particular with which a driving function is controlled.

A third function can be the acquiring of results determined by the processors 105, 110. The monitoring device 115 can also communicate with a system such as a subsystem or an actuator in the vehicle, via an interface, in a fourth function. The monitoring device 115 can provide previously received results to the processing system 100 for this, and/or it can receive external requirements for the processing system 100. Received requirements can be forwarded to the processors 105, 110 appropriately.

REFERENCE SYMBOLS 100 processing system
105 simple processor
110 parallel processor
115 monitoring device
120 IPC bus, communication bus between processors
125 sensor
130 sensor interface
135 communication module
140 communication bus
145 communication interface
150 monitoring bus
155 interface for a communication bus in the vehicle

The invention claimed is:

1. A processing system for use in a vehicle, wherein the processing system comprises:
a plurality of simple processors;
a plurality of parallel processors;
an interface configured to connect to a communication bus in the vehicle; and
a monitoring device connected to the interface and each of the plurality of simple processors and the plurality of parallel processors, wherein the monitoring device is configured to redundantly configure the plurality of simple processors and/or the plurality of parallel processors in relation to one another,
wherein each parallel processor of the plurality of parallel processors is a dedicated graphics processor, an FPGA, or a neural network,
wherein each parallel processor is connected to every other parallel processor by a dedicated line, and
wherein the monitoring device is connected to each simple processor and each parallel processor by a monitoring bus, wherein point-to-point connections are used to connect the monitoring device to each simple processor and each parallel processor.

2. The processing system according to claim 1, wherein the monitoring device is configured to determine whether one of the simple processors or one of the parallel processors is malfunctioning.

3. The processing system according to claim 1, wherein at least one parallel processor of the plurality of parallel processors is configured as a dedicated graphics processor.

4. The processing system according to claim 1, wherein each of the plurality of simple processors and the plurality of parallel processors is placed in a dedicated semiconductor housing.

5. The processing system according to claim 1, wherein the plurality of parallel processors are fully interconnected using communication busses.

6. The processing system according to claim 1, wherein the plurality of parallel processors have sensor interfaces configured to connect to a plurality of imaging sensors, and wherein the plurality of parallel processors are configured to process image data received from respective image sensors of the plurality of image sensors to which each parallel processor is connected.

7. The processing system according to claim 1, wherein the processing system is configured to control a driving function of the vehicle with signals on the communication bus.

8. The processing system according to claim 1, further comprising:
at least two redundant communication modules, wherein each communication module of the at least two redundant communication modules is connected to each of the plurality of simple processors and each of the plurality of parallel processors.

9. The processing system according to claim 8, wherein the at least two redundant communication modules each have a communication interface configured to connect to another processing system.

10. A system, comprising a plurality of processing systems according to claim 9, wherein the plurality of processing systems are connected to one another.

11. A vehicle, comprising at least one processing system according to claim 1.

12. The processing system according to claim 2, wherein at least one parallel processor of the plurality of parallel processors is configured as a dedicated graphics processor.

13. The processing system according to claim 2, wherein each of the plurality of simple processors and the plurality of parallel processors is placed in a dedicated semiconductor housing.

14. The processing system according to claim 2, wherein the plurality of parallel processors are fully interconnected using communication busses.

15. The processing system according to claim 2, wherein the plurality of parallel processors have sensor interfaces configured to connect to a plurality of imaging sensors, and wherein the plurality of parallel processors are configured to process image data received from respective image sensors of the plurality of image sensors to which each parallel processor is connected.

16. The processing system according to claim 2, wherein the processing system is configured to control a driving function of the vehicle with signals on the communication bus.

17. The processing system according to claim 2, further comprising:
   at least two redundant communication modules, wherein each communication module of the at least two redundant communication modules is connected to each of the plurality of simple processors and each of the plurality of parallel processors.

18. The processing system according to claim 8, wherein the at least two redundant communication modules each have a communication interface configured to connect to another processing system.

* * * * *